United States Patent [19]

Denzler

[11] 4,407,647

[45] Oct. 4, 1983

[54] SOAP PLODDER FOR ELIMINATION OF WET CRACKING

[75] Inventor: Rudolph E. Denzler, Stirling, N.J.

[73] Assignee: Colgate-Palmolive Company, New York, N.Y.

[21] Appl. No.: 325,716

[22] Filed: Nov. 30, 1981

[51] Int. Cl.³ .................... B29F 3/06

[52] U.S. Cl. .................... 425/208; 366/77; 366/79; 366/90; 425/376 R; 425/461

[58] Field of Search .................... 425/208, 131.1, 209, 425/202, 376 R, 461, 205-207; 264/75; 366/77, 79, 90

[56] References Cited

U.S. PATENT DOCUMENTS

| | | | |
|---|---|---|---|
| 2,494,891 | 1/1950 | Marshall | 425/199 |
| 3,267,524 | 8/1966 | Morse | 366/79 |
| 3,497,582 | 2/1970 | Pettersson | 425/192 R |
| 3,676,538 | 7/1972 | Patterson | 425/131.1 |
| 3,891,365 | 6/1975 | Fischer | 425/131.1 |
| 3,923,438 | 12/1975 | Perla | 425/131.1 |
| 3,940,220 | 2/1976 | D'Arcangeli | 264/75 |
| 3,993,722 | 11/1976 | Borcher et al. | 425/131.1 |
| 4,082,488 | 4/1978 | Brinkschröder et al. | 425/209 |
| 4,201,528 | 5/1980 | Fischer et al. | 425/209 |
| 4,310,479 | 1/1982 | Ooms et al. | 264/37 |

FOREIGN PATENT DOCUMENTS

| | | | |
|---|---|---|---|
| 660134 | 6/1964 | Italy | 425/208 |
| 907641 | 10/1962 | United Kingdom | 366/77 |
| 582965 | 12/1977 | U.S.S.R. | 425/208 |

*Primary Examiner*—Jeffery R. Thurlow
*Attorney, Agent, or Firm*—Herbert S. Sylvester; Murray M. Grill; John A. Stemwedel

[57] ABSTRACT

A soap plodder for reducing wet cracking in soap comprising a barrel and a worm rotating in the barrel. The barrel has a delivery head connected thereto. The delivery head has an orifice of the same dimensions as and communicating with a bore in the worm. The worm has one or more holes therein for feeding soap into the bore and thence through the orifice.

11 Claims, 2 Drawing Figures

SOAP PLODDER FOR ELIMINATION OF WET CRACKING

BACKGROUND OF THE INVENTION

1. Field of the Invention

This invention relates to apparatus for use in soap making and more particularly to a soap plodder for reduction and elimination of wet cracking in soaps.

2. Description of the Prior Art

Wet cracking of soaps has been a problem for many years. Studies have shown that the action of the worm in the barrel of the plodder of the type shown in U.S. Pat. No. 2,494,891 to Marshall is a major factor in wet cracking of soap during use. The reason is that the worm discharges soap in less quantity than necessary to fill the nose cone of prior art discharge heads resulting in inefficient and incomplete welds of the soaps thus resulting in the wet cracking.

SUMMARY OF THE INVENTION

It is therefore the primary object of the present invention to provide a soap plodder worm which will mix and deliver tightly welded soap mass to the delivery head as smoothly as possible.

In carrying out the object of the invention a soap plodder is provided in which the worm has a central axial bore extending partly into the worm and communicating with one or more slanted holes which extend from the peripheral surface of the worm to the central bore. The delivery head has an orifice of the same size and configuration as the central bore so that the mixed soap will be smoothly delivered through the delivery head to the conventional extrusion nozzle plates, whether single or dual.

DETAILED DESCRIPTION OF THE INVENTION

Figure 1:
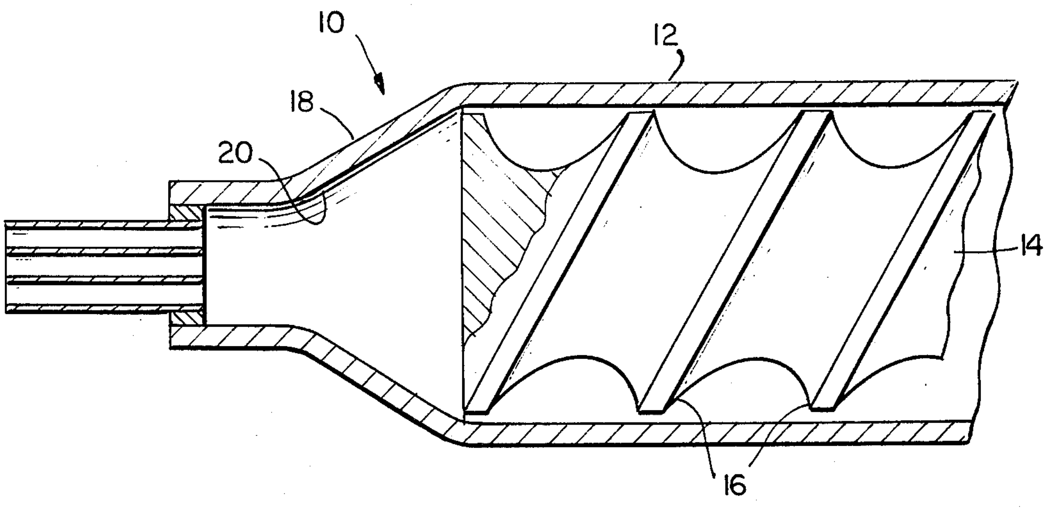
FIG. 1 PRIOR ART
FIG. 1 is a longitudinal sectional view showing schematically the arrangement of a worm in the barrel of a conventional soap plodder; and, FIG. 2 is a longitudinal sectional view of a soap plodder constructed in accordance with the present invention.
Figure 2:
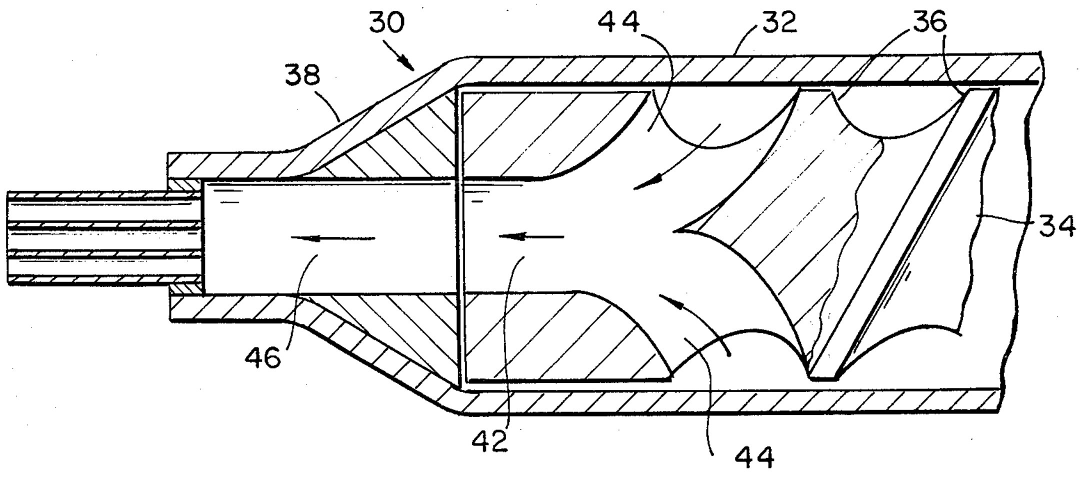

In the past, soap plodders of the configuration shown in FIG. 1, or similar thereto, were and still are being used to make soap. These plodders function well but because incomplete welds of the mixed soap are formed, wet cracking upon use of the finished soap bar or cake occurs.

This wet cracking occurs because of the relationship of parts between the worm and the delivery head of the soap plodder. The soap plodder 10 includes a barrel 12 in which a worm 14 operates. The worm is convoluted with threads 16 for mixing and advancing the soap mass. At the end of the barrel 12 is a delivery head 18 having a tapered orifice 20. As can be understood from FIG. 1, the threads of the worm deliver in strip form the mixed mass of soap into the orifice 20. This sheet is pressed against other portions of the soap mix but forms incomplete welds thereby eventually causing wet cracking.

In accordance with the concepts of the present invention the soap plodder 30 has a barrel 32 with a worm 34 operating therein. Conventional means are used to fuel soap materials for mixing into the soap plodder 30 and for driving the worm 34. The worm 34 is provided with threads thereon for mixing the soap materials and advancing the soap materials toward the delivery head 38.

The worm 34 has a central axial bore 42 therein which extends only part way through the worm 34. Communicating with the bore 42 are one or more, and preferably a plurality of holes 44 which slant inwardly, accurately, and forwardly from the peripheral surface of the worm to the bore 42. The delivery end of the worm 34 completely fills the barrel 32 so that soap mix is forced through the holes 34 into the bore 42.

Communicating with the bore 42 and closely abutting the worm 34 at the delivery end thereof is the delivery head 38 having an orifice 46 which is of identical size, shape and dimensions as the bore 42. Thus the soap mixed in the bore 42 by driving force of worm 34 is thoroughly and smoothly welded in its passage through the bore and orifice towards conventional single or dual extrusion nozzles. The soap thus plodded results in formation of cakes and bars having little or no wet cracking.

Existing plodders can be modified by fitting holes and spaces with metal or epoxy as necessary to conform with the necessary configurations of the present invention.

What is claimed is:

1. A soap plodder to reduce surface cracking in soap consisting essentially of a barrel, a delivery head connected to said barrel, a worm operating in the barrel for mixing and advancing soap toward said delivery head, said delivery head having a cylindrical exit orifice, said worm having a bore therein communicating with said orifice having at least one hole therein extending from the periphery thereof towards and communicating with said central bore for feeding soap through said bore into said orifice wherein said bore and said orifice are of the same diameter.

2. A soap plodder according to claim 1, wherein said hole extends forwardly towards said orifice.

3. A soap plodder according to claim 1, wherein said orifice is the only delivery opening for extruded soap and is of exactly the same cross sectional dimensions as said bore.

4. A soap plodder according to claim 1, wherein there are a plurality of holes in said worm.

5. A soap plodder according to claim 4, wherein said holes taper forwardly and inwardly.

6. A soap plodder according to claim 5, wherein said holes are arcuate in configuration.

7. A soap plodder according to claim 1, wherein there are a plurality of forwardly and inwardly tapering holes communicating with said bore, said bore extending only a part way through said auger.

8. A soap plodder according to claim 1, wherein said bore is centrally disposed.

9. A soap plodder according to claim 8, wherein said bore extends axially relative to said worm.

10. A soap plodder according to claim 7, wherein said bore extends centrally and axially relative to said worm.

11. A soap plodder according to claim 10, wherein said bore and said orifice are of the same cross sectional dimensions and extend axially of said worm.

* * * * *